(12) United States Patent
Eguchi

(10) Patent No.: US 7,142,372 B2
(45) Date of Patent: Nov. 28, 2006

(54) ZOOM LENS SYSTEM

(75) Inventor: Masaru Eguchi, Saitama (JP)

(73) Assignee: PENTAX Corporation, Tokyo (JP)

( * ) Notice: Subject to any disclaimer, the term of this patent is extended or adjusted under 35 U.S.C. 154(b) by 174 days.

(21) Appl. No.: 10/940,704

(22) Filed: Sep. 15, 2004

(65) Prior Publication Data

US 2005/0057819 A1   Mar. 17, 2005

(30) Foreign Application Priority Data

Sep. 16, 2003   (JP)   ............................. 2003-323657

(51) Int. Cl.
G02B 15/14   (2006.01)
(52) U.S. Cl. ..................................... 359/689
(58) Field of Classification Search ................ 359/683, 359/689
See application file for complete search history.

(56) References Cited

U.S. PATENT DOCUMENTS

| | | | |
|---|---|---|---|
| 5,550,679 A * | 8/1996 | Sugawara ................... | 359/689 |
| 5,745,301 A | 4/1998 | Betensky et al. | |
| 6,040,949 A | 3/2000 | Ohno | |
| 6,124,984 A * | 9/2000 | Shibayama et al. ......... | 359/689 |
| 6,246,529 B1 | 6/2001 | Sensui | |
| 6,515,803 B1 * | 2/2003 | Hirose ........................ | 359/682 |
| 6,522,476 B1 | 2/2003 | Koreeda | |
| 6,621,642 B1 | 9/2003 | Hagimori | |
| 6,781,768 B1 | 8/2004 | Minefuji | |
| 2003/0197949 A1 | 10/2003 | Eguchi | |
| 2004/0012859 A1 | 1/2004 | Minefuji | |
| 2004/0051958 A1 | 3/2004 | Yoneyama | |

FOREIGN PATENT DOCUMENTS

| | | |
|---|---|---|
| JP | 10-513270 | 12/1998 |
| JP | 11-237549 | 8/1999 |
| JP | 2002-55278 | 2/2002 |

OTHER PUBLICATIONS

U.S. Appl. No. 10/929,364 to Saori, filed Aug. 31, 2004.
U.S. Appl. No. 10/940,704, to Eguchi, filed Sep. 15, 2004.

* cited by examiner

Primary Examiner—Scott J. Sugarman
(74) Attorney, Agent, or Firm—Greenblum & Bernstein, P.L.C.

(57) ABSTRACT

A zoom lens system includes a negative first lens group which is stationary or movable, a positive second lens group which is movable, and a positive third lens group which is movable, in this order from the object.

Upon zooming from the short focal length extremity to the long focal length extremity, a distance between the negative first lens group and the positive second lens group decreases, and a distance between the positive second lens group and the positive third lens group increases.

The zoom lens system satisfies the following conditions:

$$0.3 < fw/|f_1| < 0.65 \quad (f1<0) \tag{1}$$

$$0.6 < fw/f_2 < 1.2 \tag{2}$$

$$0.3 < fw/f_3 < 0.6 \tag{3}$$

wherein
fw designates the focal length of the entire zoom lens system at the short focal length extremity; and
$f_i$ designates the focal length of the $i^{th}$ lens group (i=1, 2, 3).

5 Claims, 9 Drawing Sheets

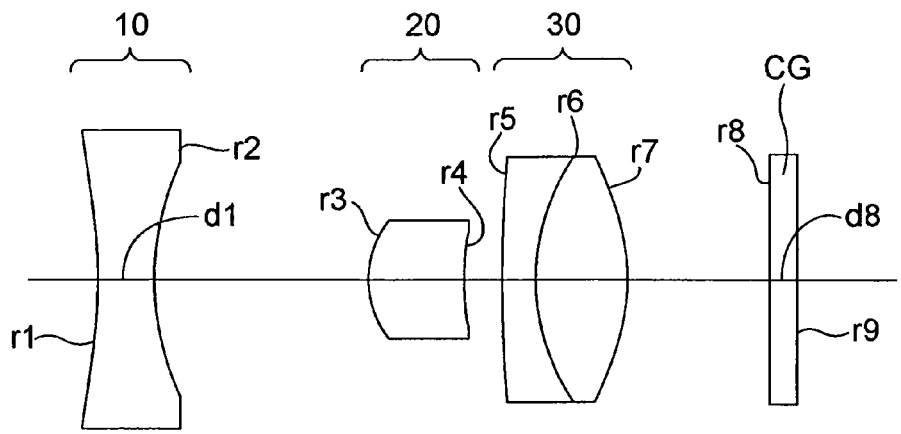
Fig. 1
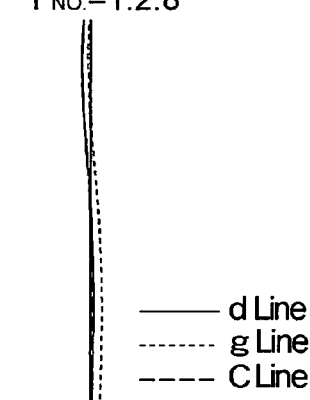
Fig. 2A
F_{NO.}=1:2.8
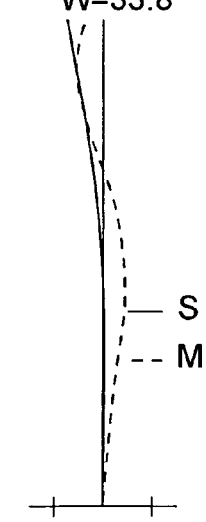
Fig. 2B
W=33.8°
Fig. 2C
W=33.8°
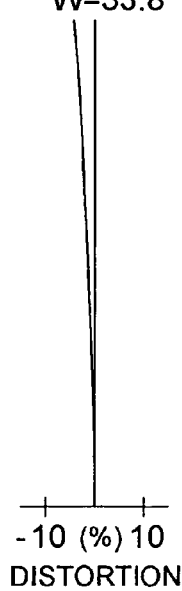
Fig. 2D
W=33.8°

Fig. 5
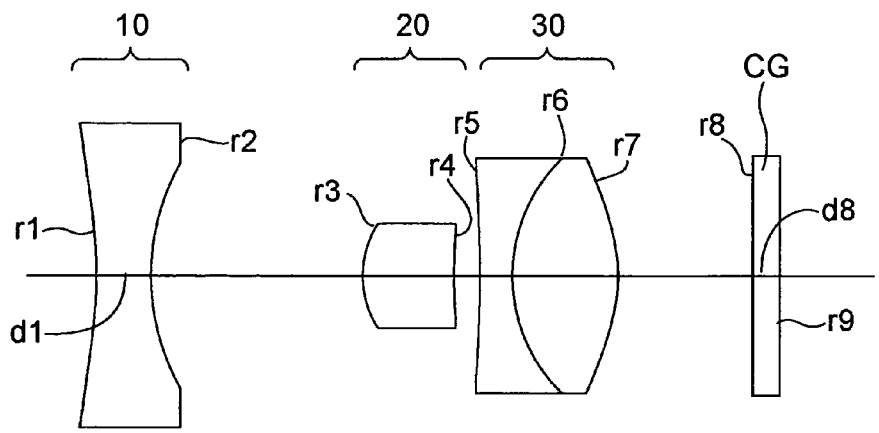
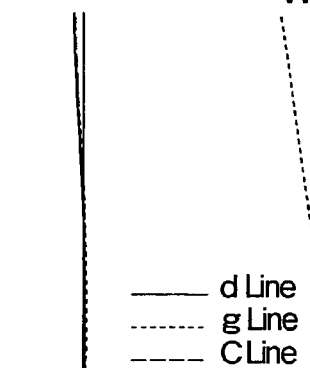
Fig. 6A
F$_{NO.}$=1:2.8
SPHERICAL
ABERRATION
CHROMATIC
ABERRATION
Fig. 6B
W=38.0°
—— d Line
----- g Line
--- C Line
LATERAL
CHROMATIC
ABERRATION
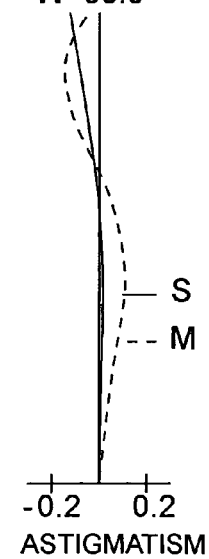
Fig. 6C
W=38.0°
— S
-- M
ASTIGMATISM
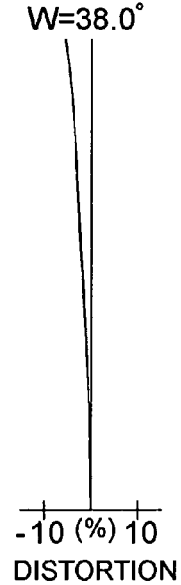
Fig. 6D
W=38.0°
DISTORTION

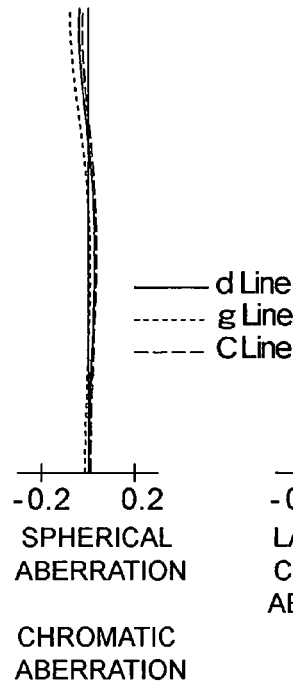
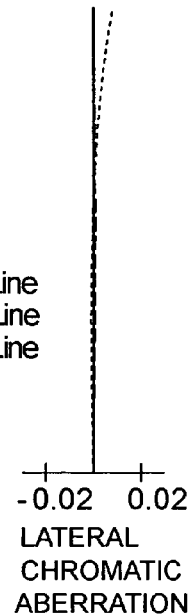
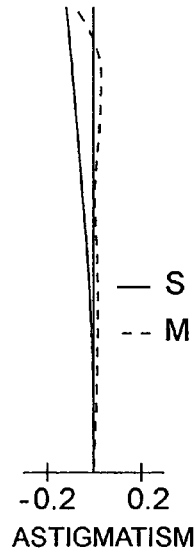
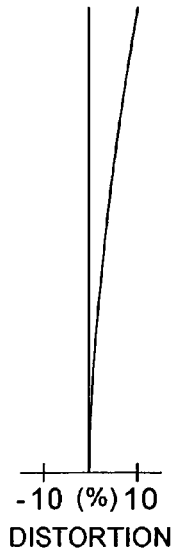
Fig. 7A  F_NO.= 1:4.6  SPHERICAL ABERRATION  CHROMATIC ABERRATION
Fig. 7B  W=18.8°  LATERAL CHROMATIC ABERRATION
Fig. 7C  W=18.8°  ASTIGMATISM
Fig. 7D  W=18.8°  DISTORTION
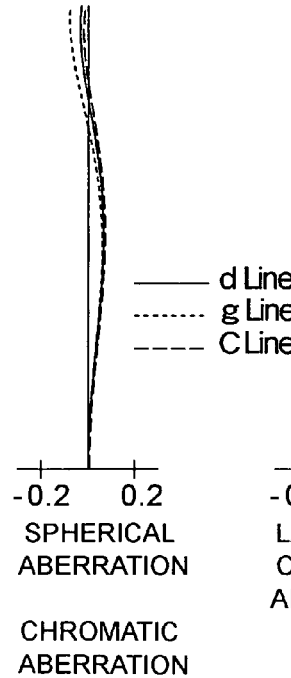
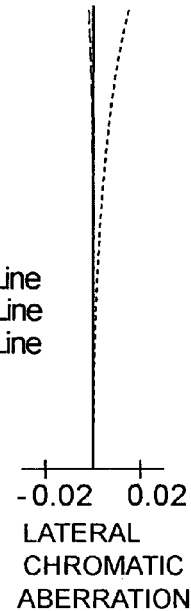
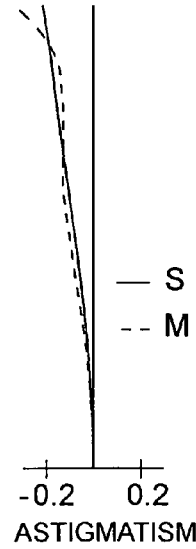
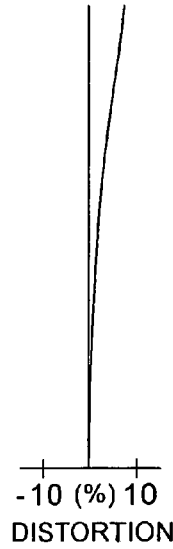
Fig. 8A  F_NO.=1:6.4  SPHERICAL ABERRATION  CHROMATIC ABERRATION
Fig. 8B  W=12.9°  LATERAL CHROMATIC ABERRATION
Fig. 8C  W=12.9°  ASTIGMATISM
Fig. 8D  W=12.9°  DISTORTION Fig. 9
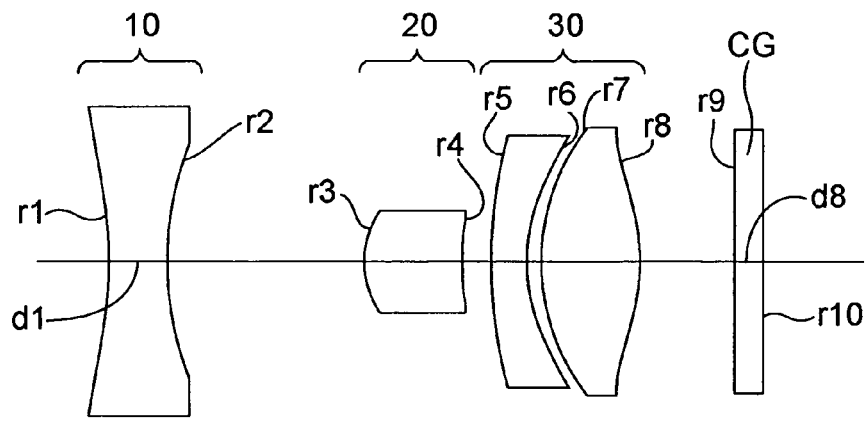
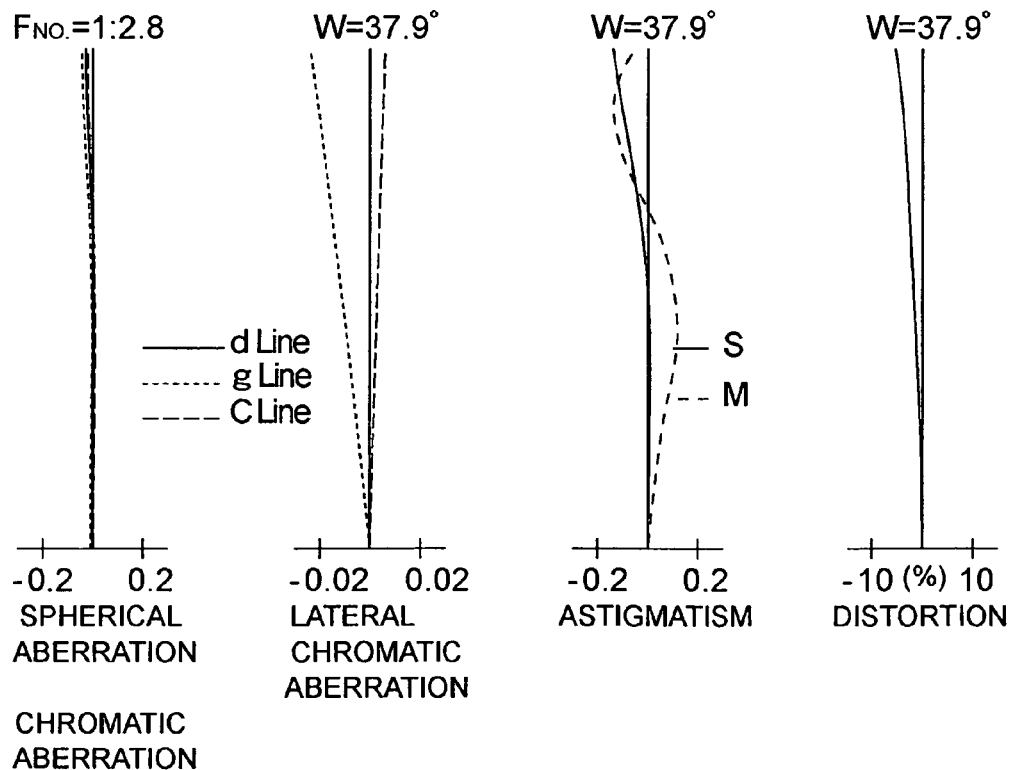
Fig. 10A  Fig. 10B  Fig. 10C  Fig. 10D

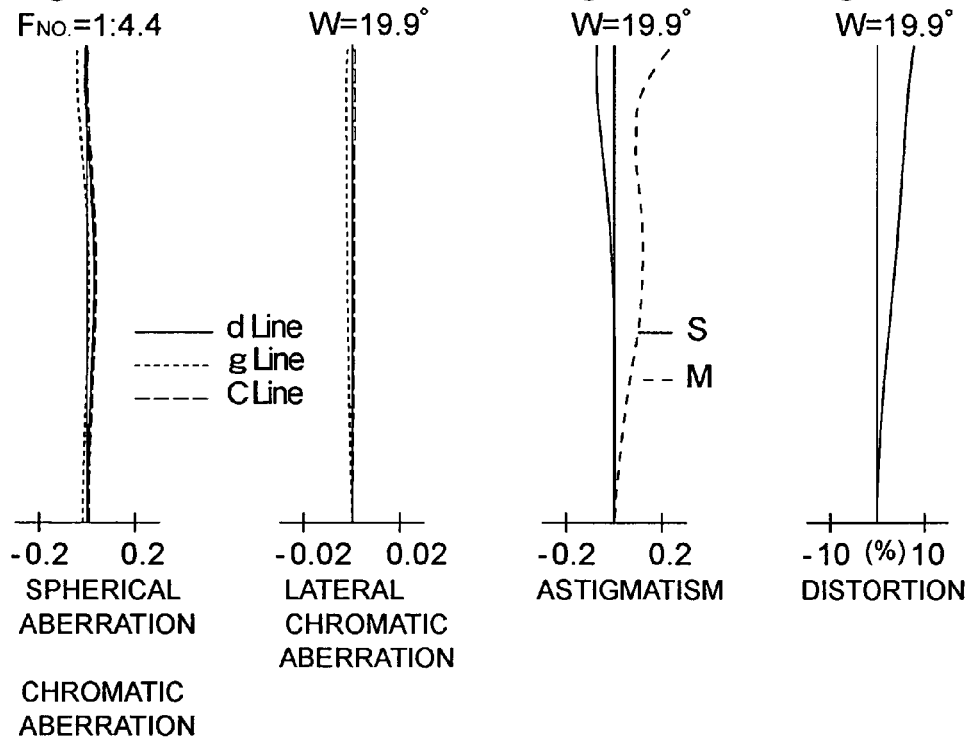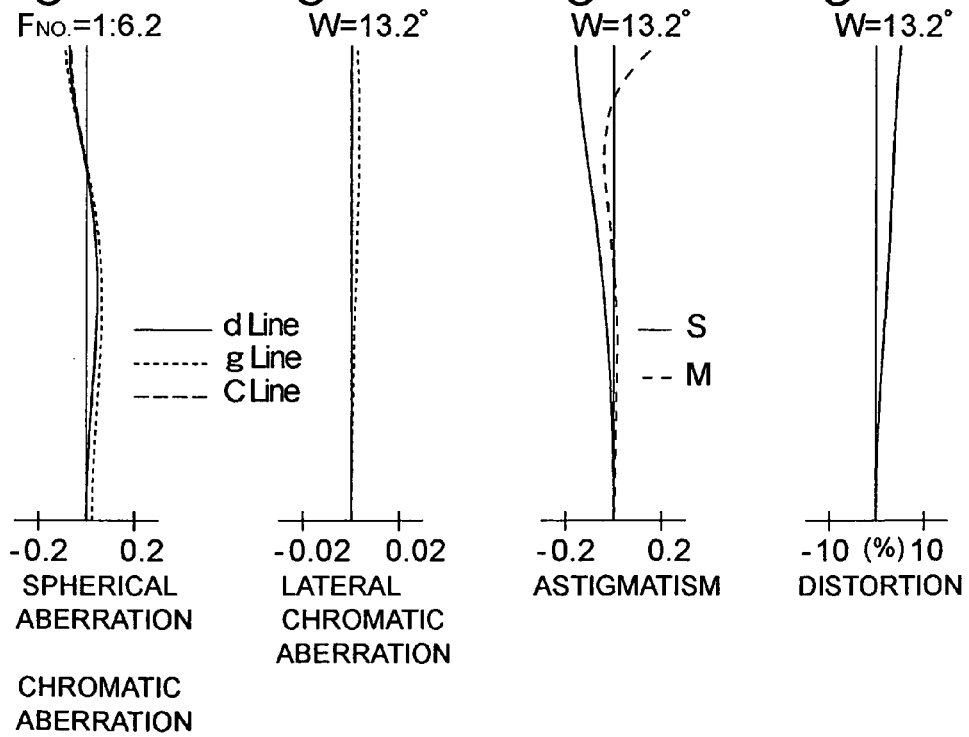

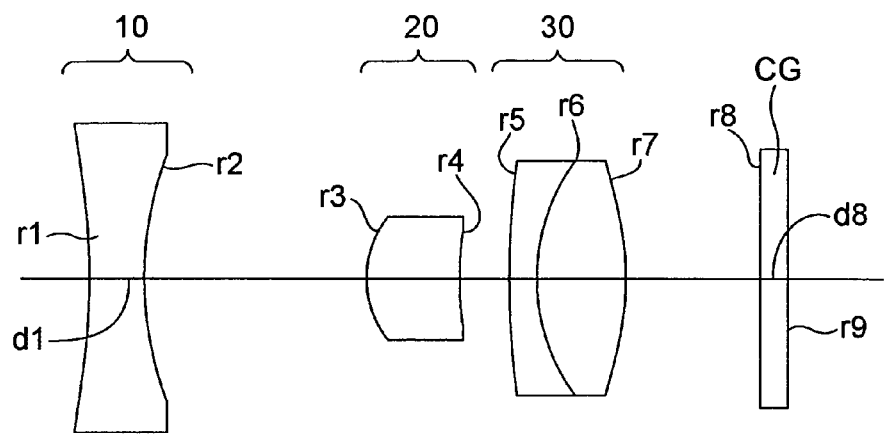
Fig. 13
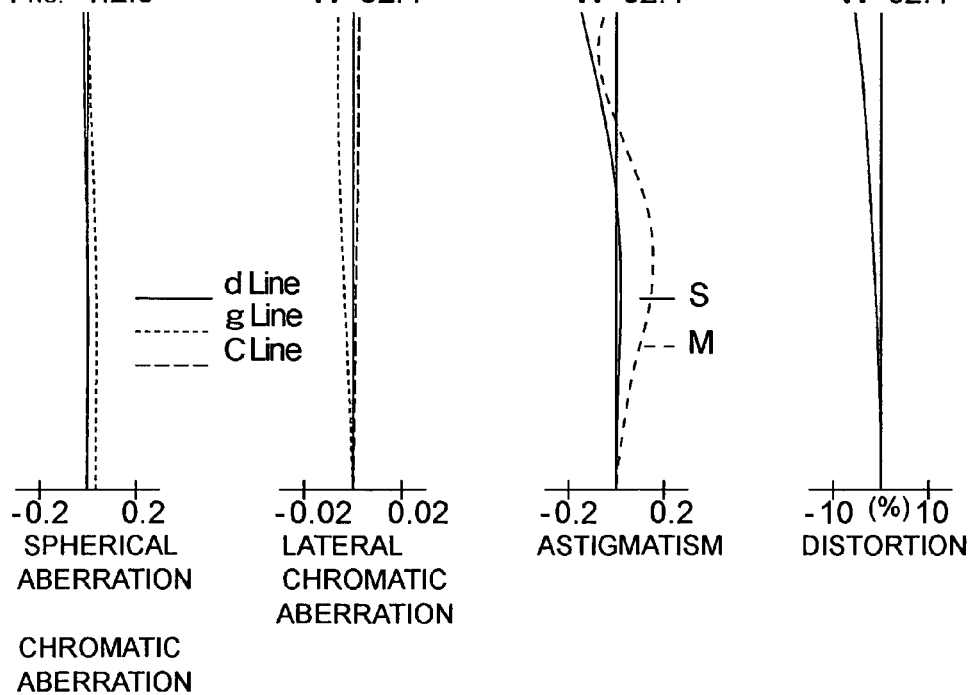

Fig. 15A　Fig. 15B　Fig. 15C　Fig. 15D
F$_{NO.}$=1:3.7　W=21.1°　W=21.1°　W=21.1°

— d Line
······ g Line
--- C Line

— S
-- M

-0.2　0.2　　-0.02　0.02　　-0.2　0.2　　-10 (%) 10
SPHERICAL　LATERAL　ASTIGMATISM　DISTORTION
ABERRATION　CHROMATIC
　　　　　ABERRATION
CHROMATIC
ABERRATION

Fig. 16A　Fig. 16B　Fig. 16C　Fig. 16D
F$_{NO.}$=1:4.4　W=15.8°　W=15.8°　W=15.8°

— d Line
······ g Line
--- C Line

— S
-- M

-0.2　0.2　　-0.02　0.02　　-0.2　0.2　　-10 (%) 10
SPHERICAL　LATERAL　ASTIGMATISM　DISTORTION
ABERRATION　CHROMATIC
　　　　　ABERRATION
CHROMATIC
ABERRATION

ZOOM LENS SYSTEM

BACKGROUND OF THE INVENTION

1. Field of the Invention

The present invention relates to a zoom lens system for an electronic still camera (digital camera) having a wide angle-of-view (i.e., a shorter focal length at the short focal length extremity) and a zoom ratio of approximately 3.

2. Description of the Prior Art

In recent years, a digital camera is not only used as a camera per se, but also provided in a portable data handset (PDA: Personal Digital Assistant) and a mobile phone, etc. An imaging device (imaging module), such as a CCD and a CMOS, used for such a digital camera has been required to be very much miniaturized. Therefore an imaging device with a relatively smaller effective imaging area has often been used; and there have been many digital cameras whose optical system is constituted by a smaller number of lens elements.

As a small-sized zoom lens system which has a smaller number of lens elements, a negative-lead type lens system has been frequently employed. In such a lens system, there are at least two advantages, i.e., (i) the focal length of the lens system can be made shorter at the short focal length extremity, and (ii) telecentricity on the image side can be maintained.

For example, the following Japanese Unexamined Patent Publications (hereinafter, JUPP) have disclosed a negative-lead type lens system of three (and two)-lens-group arrangement, and drawbacks thereof will be discussed hereinafter:

JUPP No.2002-55278, JUPP No.Hei-11-237549, and JUPP No.Hei-10-513270.

In JUPP No. 2002-55278, a zoom lens system of a three-lens-group arrangement has been disclosed, i.e., a first lens group having a negative refractive power (hereinafter, a negative first lens group), a second lens group having a positive refractive power (hereinafter, a positive second lens group), and a third lens group having a positive refractive power (hereinafter, a positive third lens group), in this order from the object; and the third lens group has a weaker positive refractive power (hereinafter, positive power). However, zooming is mainly performed by the first lens group and the second lens group. As a result, the third lens group does not substantially contribute to zooming, so that the zoom lens system has not sufficiently been miniaturized.

In JUPP No. Hei-11-237549, a zoom lens system of a three-lens-group arrangement has been disclosed, i.e., a negative first lens group, a positive second lens group, and a positive third lens group, in this order from the object; and the power of each lens group is weak, and the power of the second lens group is particularly weak. Consequently, the distance between the first lens group and the second lens group becomes longer, so that the overall length of the zoom lens system becomes longer.

In JUPP No.Hei-10-513270, a zoom lens system of a three-lens-group arrangement has been disclosed, i.e., a negative first lens group, a positive second lens group, and a positive third lens group, in this order from the object; and the power of the positive second lens group is weak, so that the zoom ration is less than two. Consequently, this publication is not worth discussing on whether the entire optical system is longer or shorter.

If an attempt is made to make the overall length of the zoom lens system shorter, it is understood that the power of each lens group is made stronger so that the traveling distances of the lens groups become shorter. However, if the power of a lens group is made stronger, aberrations become larger. Consequently, it becomes difficult to correct aberrations suitably over the entire zooming range.

SUMMARY OF THE INVENTION

The present invention, with consideration of the above-described drawbacks, provides a small-sized and high-quality zoom lens system having a negative lens group, a positive lens group and a positive lens group, in this order from the object.

According to an aspect of the present invention, there is provided a zoom lens system including a negative first lens group which is stationary or movable, a positive second lens group which is movable, and a positive third lens group which is movable, in this order from the object.

Upon zooming from the short focal length extremity to the long focal length extremity, a distance between the negative first lens group and the positive second lens group decreases, and a distance between the positive second lens group and the positive third lens group increases.

The zoom lens system satisfies the following conditions:

$$0.3 < fw/|f_1| < 0.65 (f1<0) \quad (1)$$

$$0.6 < fw/f_2 < 1.2 \quad (2)$$

$$0.3 < fw/f_3 < 0.6 \quad (3)$$

wherein fw designates the focal length of the entire zoom lens system at the short focal length extremity; and $f_i$ designates the focal length of the $i^{th}$ lens group (i=1, 2, 3).

Both further miniaturization of the zoom lens system and higher performance thereof can be attained by suitably distributing refractive power (hereinafter, power) over each lens group so that conditions (1) to (3) are satisfied.

The zoom lens system preferably satisfies the following conditions:

$$1.3 < m_{2t}/m_{2w} < 2.6 \quad (4)$$

$$1.1 < m_{3t}/m_{3w} < 1.6 \quad (5)$$

wherein $m_{it}$ designates the lateral magnification of the $i^{th}$ lens group (i=2, 3) at the long focal length extremity when an object at infinity is in an in-focus state: and $m_{iw}$ designates the lateral magnification of the $i^{th}$ lens group (i=2, 3) at the short focal length extremity when an object at infinity is in an in-focus state.

The negative first lens group is preferably constituted by a single biconcave lens element which satisfies the following condition:

$$0.3 < fw/|r1| < 0.65 (r1<0) \quad (6)$$

wherein r1 designates the radius of curvature of the object-side surface of the single biconcave lens element.

The positive second lens group is preferably constituted by a single positive lens element which satisfies the following condition:

$$75 < v2 \quad (7)$$

wherein v2 designates the Abbe number of the single positive lens element.

The positive third lens group is preferably constituted by a positive lens element and a negative lens element which can be bonded, or may not be bonded. The positive lens element and the negative lens element satisfy the following condition:

$$25 < \nu_{3p} - \nu_{3n} \qquad (8)$$

wherein $\nu_{3p}$ designates the Abbe number of the positive lens element of the third lens group; and $\nu_{3n}$ designates the Abbe number of the negative lens element of the third lens group.

The present disclosure relates to subject matter contained in Japanese Patent Application No. 2003-323657 (filed on Sep. 16, 2003) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the zoom lens system according to a first embodiment of the present invention;

FIGS. 2A, 2B, 2C and 2D show aberrations occurred in the lens arrangement shown in FIG. 1 at the short focal length extremity;

FIG. 5 is a lens arrangement of the zoom lens system according to a second embodiment of the present invention;

FIGS. 6A, 6B, 6C and 6D show aberrations occurred in the lens arrangement shown in FIG. 5 at the short focal length extremity;

FIGS. 7A, 7B, 7C and 7D show aberrations occurred in the lens arrangement shown in FIG. 5 at an intermediate focal length;

FIGS. 8A, 8B, 8C and 8D show aberrations occurred in the lens arrangement shown in FIG. 5 at the long focal length extremity;

FIG. 9 is a lens arrangement of the zoom lens system according to a third embodiment of the present invention;

FIGS. 10A, 10B, 10C and 10D show aberrations occurred in the lens arrangement shown in FIG. 9 at the short focal length extremity;

FIGS. 11A, 11B, 11C and 11D show aberrations occurred in the lens arrangement shown in FIG. 9 at an intermediate focal length;

FIGS. 12A, 12B, 12C and 12D show aberrations occurred in the lens arrangement shown in FIG. 9 at the long focal length extremity;

FIG. 13 is a lens arrangement of the zoom lens System according to a fourth embodiment of the present invention;

FIGS. 14A, 14B, 14C and 14D show aberrations occurred in the lens arrangement shown in FIG. 13 at the short focal length extremity;

FIGS. 15A, 15B, 15C and 15D show aberrations occurred in the lens arrangement shown in FIG. 13 at an intermediate focal length;

FIGS. 16A, 16B, 16C and 16D show aberrations occurred in the lens arrangement shown in FIG. 13 at the long focal length extremity.

DESCRIPTION OF THE PREFERRED EMBODIMENTS

Figures 3A, 3B, 3C, 3D, 4A, 4B, 4C, 4D:
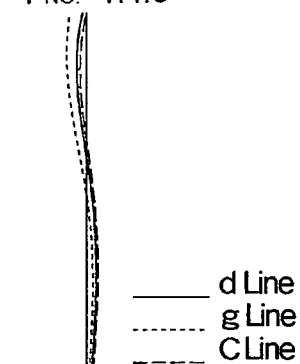
FIGS. 3A, 3B, 3C and 3D show aberrations occurred in the lens arrangement shown in FIG. 1 at an intermediate focal length.
FIGS. 4A, 4B, 4C and 4D show aberrations occurred in the lens arrangement shown in FIG. 1 at the long focal length extremity.
Figure 17:
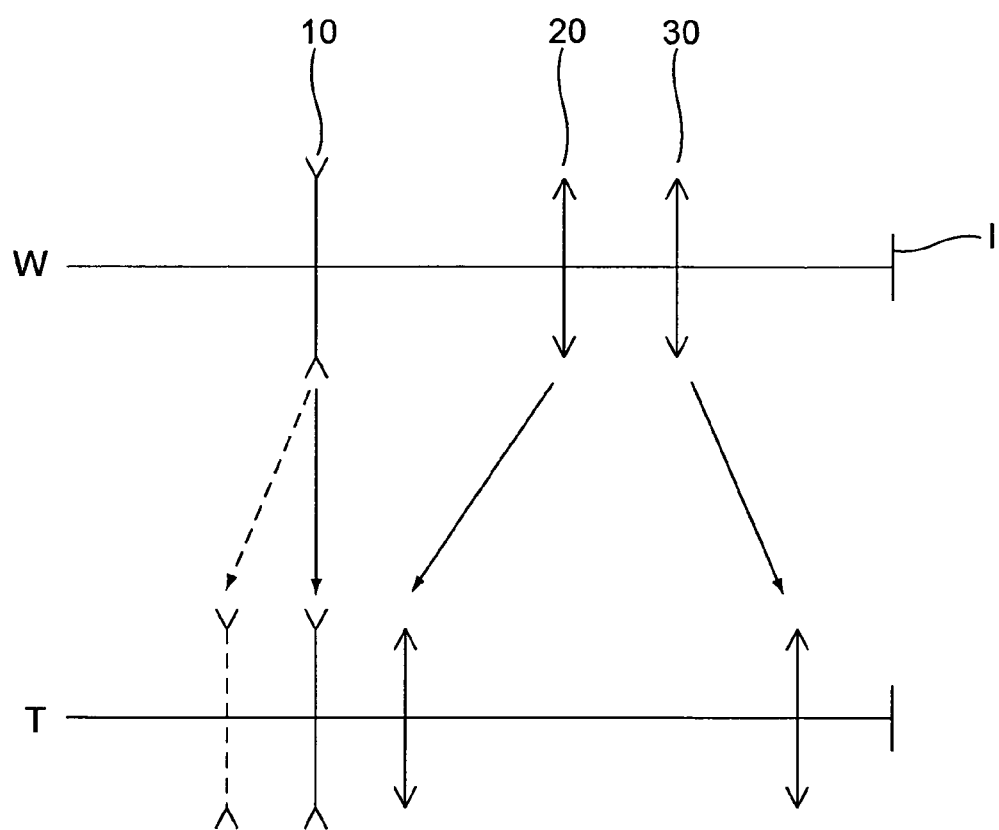
FIG. 17 shows lens-group moving paths upon zooming, with respect to the zoom lens system according to the present invention.

The zoom lens system of the present invention, as shown in the lens-group moving paths of FIG. 17, is constituted by a negative first lens group 10, a positive second lens group 20, and a positive third lens group 30, in this order from the object.

Upon zooming from the short focal length extremity (W) to the long focal length extremity (T), the negative first lens group 10 remains stationary (indicated by the solid line), or moves toward the object (indicated by the dotted line); the positive second lens group 20 moves toward the object; and the positive third lens group 30 moves toward the image. As a result, the distance between the negative first lens group and the positive second lens group decreases; and the distance between the positive second lens group and the positive third lens group increases.

In FIG. 17, the letter "I" indicates the image plane; and in a digital camera, a filter group is provided immediately in front of the image plane I.

A diaphragm in which the diameter of the opening (aperture) is invariable (hereinafter, simply referred to as a diaphragm) is provided in the close vicinity of at least one of the most object-side surface and the most image-side surface of the positive second lens group 20, and moves together with the positive second lens group 20 upon zooming.

Focusing is performed by moving at least any one of the negative first lens group 10, the positive second lens group 20 and the positive third lens group 30.

The negative first lens group 10 is constituted by a single biconcave lens element. The positive second lens group 20 is constituted by a single positive lens element. The positive third lens group 30 is constituted by a positive lens element and a negative lens element. Note that the positive and negative lens elements which are cemented can constitute the positive third lens group 30, or the discrete (i.e., not cemented) positive and negative lens elements can also constitute the positive third lens group 30.

Condition (1) specifies the ratio of the focal length of the entire zoom lens system at the short focal length extremity to the focal length of the negative first lens group 10, i.e., the focal-length range of the negative first lens group 10 with respect to the focal length of the entire zoom lens system at the short focal length extremity is determined.

If fw/|f$_1$| exceeds the lower limit of condition (1), the negative refractive power of the negative first lens group 10 becomes weaker, so that it becomes difficult to make the focal length of the entire zoom lens system at the short focal length extremity shorter, i.e., obtaining a wider-angle of view at the short focal length extremity is difficult.

If the negative refractive power of the negative first lens group 10 becomes stronger to the extent that fw/|f$_1$| exceeds the upper limit of condition (1), the back focal distance becomes longer. Consequently, the overall length of the zoom lens system becomes undesirably longer.

Condition (2) specifies the ratio of the focal length of the entire zoom lens system at the short focal length extremity to the focal length of the positive second lens group 20, i.e., the focal-length range of the positive second lens group 20 with respect to the focal length of the entire zoom lens system at the short focal length extremity is determined.

The positive second lens group 20 and the positive third lens group 30 have positive refractive power, and the zooming function is mainly performed by these lens groups. Accordingly, it is necessary to appropriately distribute the positive refractive power over the positive second lens group 20 and the positive third lens group 30.

If the positive refractive power of the positive second lens group 20 becomes weaker to the extent that fw/f$_2$ exceeds the lower limit of condition (2), the traveling distance of the positive second lens group 20 becomes longer if an attempt is made to achieve a desired zoom ratio. Consequently, the overall length of the zoom lens system at the long focal length extremity becomes longer.

If the positive refractive power of the positive second lens group 20 becomes stronger to the extent that fw/f$_2$ exceeds the upper limit of condition (2), the refractive power of each lens group of the zoom lens system becomes stronger. Consequently, the correcting of aberrations becomes difficult, so that adequate image-forming performance of the zoom lens system cannot be achieved.

Condition (3) specifies the ratio of the focal length of the entire zoom lens system at the short focal length extremity to the focal length of the positive third lens group 30, i.e., the focal-length range of the positive third lens group 30 with respect to the focal length of the entire zoom lens system at the short focal length extremity is determined.

In addition to the zooming function, the positive third lens group 30 also has a function to secure appropriate telecentricity, i.e., the positive third lens group 30 works to make the exit pupil position from the image plane farther.

If fw/f$_3$ exceeds the lower limit of condition (3), the positive refractive power of the positive third lens group 30 becomes weaker. As a result, the exit pupil position at the short focal length extremity approaches the image plane, so that telecentricity cannot be maintained.

If the positive refractive power of the positive third lens group 30 becomes stronger to the extent that fw/f$_3$ exceeds the upper limit of condition (3), the positive refractive power of the positive second lens group 20 becomes relatively weaker. Consequently, the traveling distance of the positive second lens group 20 becomes longer, so that the overall length of the zoom lens system at the long focal a length extremity becomes longer. Furthermore, field curvature and astigmatism at the long focal length extremity deteriorate, so that adequate image-forming performance of the zoom lens system cannot be attained.

As explained, the positive second lens group 20 and the positive third lens group 30 respectively have the positive refractive power so that conditions (2) and (3) are satisfied; and for the purpose of zooming, the positive second lens group 20 is arranged to move toward the object, and the positive third lens group 30 is arranged to move toward the image. In other words, in addition to the positive second lens group 20, the positive third lens group 30 has the zooming function. Due to this arrangement, the load of zooming function imposed on the positive second lens group 20 can be reduced; and the lens-group moving paths of the positive second lens group 20 and the positive third lens group 30 can be optimized for further miniaturization of the zoom lens system, and the correcting of aberrations can be made easier.

Condition (4) specifies the ratio of the lateral magnification of the positive second lens group 20 at the long focal length extremity to the lateral magnification thereof at the short focal length extremity. Namely, condition (4) determines the zooming function of the positive second lens group 20.

Condition (5) specifies the ratio of the lateral magnification of the positive third lens group 30 at the long focal length extremity to the lateral magnification thereof at the short focal length extremity. Namely, condition (5) determines the zooming function of the positive third lens group 30.

Conditions (4) and (5) are provided for the purpose of achieving both further miniaturization of the zoom lens system and higher optical performance thereof.

If the positive second lens group 20 does not satisfy condition (4), the positive third lens group 30 has to share a larger portion of the zooming function in order to achieve a predetermined zoom ratio.

Likewise, if the positive third lens group 30 does not satisfy condition (5), the positive second lens group 20 has to share a larger portion of the zooming function in order to achieve a predetermined zoom ratio.

Due to the above drawbacks, the traveling distance of each lens group cannot be well balanced, so that the overall length of the zoom lens system becomes longer.

For the purpose of further miniaturization of the zoom lens system, the negative first lens group 10 is preferably constituted by a single negative lens element.

Furthermore, in order to make (i) the diameter of the negative first lens group 10 smaller, and (ii) the focal length of the zoom lens system at the short focal length extremity shorter, the most object-side surface of the negative first lens group 10 is preferably formed as a concave surface.

Condition (6) specifies the radius of curvature of the most object-side surface of the negative first lens group 10 (hereinafter, the radius of curvature in regard to condition (6)) in the case where the negative first lens group 10 is constituted by a single biconcave lens element.

If the radius of curvature becomes larger to the extent that fw/|r1| exceeds the lower limit of condition (6), it becomes difficult to make (i) the diameter of the negative first lens group 10 smaller, and (ii) the focal length of the zoom lens system at the short focal length extremity shorter.

If fw/|r1| exceeds the upper limit of condition (6), the radius of curvature becomes smaller, and the focal length of the zoom lens system at the short focal length extremity can be made shorter. However, the correcting of off-axis aberrations, such as astigmatism and distortion, etc., becomes difficult. In this regard, in order to correct astigmatism and distortion, the negative first lens group 10 is preferably provided with at lease one aspherical surface therein.

For the purpose of achieving further miniaturization of the zoom lens system and cost reduction, the positive second lens group 20 is preferably constituted by a single positive lens element. Moreover, in order to reduce on-axis chromatic aberration and lateral chromatic aberration, the Abbe number of a glass material is preferably selected to satisfy condition (7).

If the Abbe number of the glass material of the single positive lens element constituting the positive second lens group 20 becomes smaller to the extent that ν2 exceeds the lower limit of condition (7), the correcting of both on-axis chromatic aberration and lateral chromatic aberration cannot be made in a well balanced manner. Consequently, the image-forming performance of the zoom lens system deteriorates.

In the positive third lens group 30, the height of an off-axis light ray from the optical axis is generally higher. Accordingly, the positive third lens group 30 is preferably constituted by two lens elements, i.e., a positive lens element and a negative lens element, in order to correct chromatic aberration; and the positive third lens group 30 preferably satisfies condition (8).

If the difference of the Abbe numbers becomes smaller to the extent that ν$_{3p}$−ν$_3$ exceed the lower limit of condition (8), the effect of the correcting of chromatic aberration is smaller, and the image-forming performance of the zoom lens system deteriorates.

At least one lens surface among the lens surfaces of the positive second lens group 20 and the positive third lens group 30 is preferably formed as an aspherical surface. Due to this arrangement, aberrations over the entire focal length range can be suitably corrected. The lens element with the aspherical surface is more preferably made of plastic for a cost-reduction purpose, while the lens element can be made of glass.

Specific numerical data of the embodiments will be described hereinafter.

In the diagrams of chromatic aberration (on-axis chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, $F_{NO}$ designates the f-number, f designates the focal length of the entire wide-angle zoom lens system, $f_B$ designates the back focal distance (the equivalent air thickness along the optical axis from the most image-side surface of the cover glass CG to the image plane of the imaging device (CCD)), W designates the half angle-of-view (°), r designates the radius of curvature, d designates the lens-element thickness or distance between lens elements, $N_d$ designates the refractive index of the d-line, and ν designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}\ldots$$

wherein:
c designates a curvature of the aspherical vertex (1/r);
y designates a distance from the optical axis;
K designates the conic coefficient;
A4 designates a fourth-order aspherical coefficient;
A6 designates a sixth-order aspherical coefficient;
A8 designates a eighth-order aspherical coefficient; and
A10 designates a tenth-order aspherical coefficient.

[Embodiment 1]

FIG. 1 is the lens arrangement of the zoom lens system according to the first embodiment of the present invention. FIGS. 2A through 2E show aberrations occurred in the lens arrangement shown in FIG. 1 at the short focal length extremity. FIGS. 3A through 3D show aberrations occurred in the lens arrangement shown in FIG. 1 at an intermediate focal length. FIGS. 4A through 4D show aberrations occurred in the lens arrangement shown in FIG. 1 at the long focal length extremity. Table 1 shows the numerical values of the first embodiment.

The negative first lens group 10 is constituted by a single biconvex lens element.

The positive second lens group 20 is constituted by a single positive lens element.

The positive third lens group 30 is constituted by cemented lens element including a negative lens element and a positive lens element in this order from the object.

The symbol CG designates a cover glass (a filter group provided in front of the imaging device).

A diaphragm having an a radius of 1.06 is provided on the object-side of the positive second lens group 20, and the other diaphragm having a radius of 0.84 is provided on the image-side of the positive second lens group 20.

In regard to the lens-group moving paths of FIG. 17, the negative first lens group 10 of the first embodiment is arranged to be movable, as indicated by the dotted line.

TABLE 1

FNo. = 1:2.8–4.6–6.2
f = 3.52–7.00–10.55
W = 33.8–16.7–11.5
fB = 0.00–0.00–0.00

| Surf. No. | r | d | Nd | ν |
|---|---|---|---|---|
| 1* | −8.722 | 1.00 | 1.49176 | 57.4 |
| 2 | 5.028 | 3.79–1.75–0.78 | | |
| 3* | 1.693 | 1.70 | 1.43875 | 95.0 |
| 4* | 7.390 | 0.68–5.69–8.94 | | |
| 5 | 26.775 | 0.60 | 1.76182 | 26.5 |
| 6 | 3.917 | 1.65 | 1.49700 | 81.6 |
| 7* | −3.440 | 2.54–1.08–0.50 | | |
| 8 | ∞ | 0.50 | 1.51633 | 64.1 |
| 9 | ∞ | — | | |

*designates the aspherical surface which is rotationally symmetrical with respect to the optical axis.

Aspherical surface data (the aspherical surface coefficients not indicated are zero (0.00)):

| Surf. NO | A4 | A6 |
|---|---|---|
| 1 | $0.25518 \times 10^{-2}$ | $0.36735 \times 10^{-3}$ |
| 3 | $-0.77626 \times 10^{-2}$ | $0.22192 \times 10^{-2}$ |
| 4 | $0.44144 \times 10^{-1}$ | $-0.11210 \times 10^{-3}$ |
| 7 | $0.12601 \times 10^{-1}$ | $-0.23819 \times 10^{-2}$ |

| Surf. NO | A8 | A10 |
|---|---|---|
| 1 | $-0.81456 \times 10^{-4}$ | $0.46306 \times 10^{-5}$ |
| 3 | $-0.15143 \times 10^{-2}$ | |
| 4 | $0.17043 \times 10^{-1}$ | |
| 7 | $0.58418 \times 10^{-3}$ | $-0.51456 \times 10^{-4}$ |

[Embodiment 2]

FIG. 5 is the lens arrangement of the zoom lens system according to the second embodiment of the present invention. FIGS. 6A through 6D show aberrations occurred in the lens arrangement shown in FIG. 5 at the short focal length extremity. FIGS. 7A through 7D show aberrations occurred in the lens arrangement shown in FIG. 5 at an intermediate focal length. FIGS. 8A through 8D show aberrations occurred in the lens arrangement shown in FIG. 5 at the long focal length extremity. Table 2 shows the numerical values of the second embodiment.

A diaphragm having a radius of 0.97 is provided on the object-side of the positive second lens group 20, and the other diaphragm having a radius of 0.78 is provided on the image-side of the positive second lens group 20.

The basic lens arrangement is the same as the first embodiment.

In regard to the lens-group moving paths of FIG. 17, the negative first lens group 10 of the second embodiment is arranged to be movable, as indicated by the dotted line.

TABLE 2

FNo. = 1:2.8–4.6–6.4
f = 3.06–5.99–9.17
W = 38.0–18.8–12.9
fB = 0.00–0.00–0.00

| Surf. No. | r | d | Nd | ν |
|---|---|---|---|---|
| 1* | −8.597 | 1.00 | 1.49176 | 57.4 |
| 2 | 4.279 | 3.88–2.07–1.20 | | |
| 3* | 1.766 | 1.70 | 1.43875 | 95.0 |
| 4* | 12.732 | 0.49–5.14–8.35 | | |
| 5 | −25.469 | 0.60 | 1.58547 | 29.9 |
| 6 | 3.067 | 1.95 | 1.52538 | 56.3 |
| 7* | −3.134 | 2.46–1.24–0.49 | | |
| 8 | ∞ | 0.50 | 1.51633 | 64.1 |
| 9 | ∞ | — | | |

*designates the aspherical surface which is rotationally symmetrical with respect to the optical axis.

Aspherical surface data (the aspherical surface coefficients not indicated are zero (0.00)):

| Surf. NO | A4 | A6 |
|---|---|---|
| 1 | $0.27608 \times 10^{-2}$ | $0.40061 \times 10^{-3}$ |
| 3 | $-0.32619 \times 10^{-2}$ | $-0.28996 \times 10^{-3}$ |
| 4 | $0.43821 \times 10^{-1}$ | $-0.61540 \times 10^{-2}$ |
| 7 | $0.16042 \times 10^{-1}$ | $-0.24337 \times 10^{-2}$ |

| Surf. NO | A8 | A10 |
|---|---|---|
| 1 | $-0.79974 \times 10^{-4}$ | $0.40734 \times 10^{-5}$ |
| 3 | $-0.27334 \times 10^{-3}$ | |
| 4 | $0.15562 \times 10^{-1}$ | |
| 7 | $0.64692 \times 10^{-3}$ | $-0.56103 \times 10^{-4}$ |

[Embodiment 3]

FIG. 9 is the lens arrangement of the zoom lens system according to the third embodiment of the present invention. FIGS. 10A through 10D show aberrations occurred in the lens arrangement shown in FIG. 9 at the short focal length extremity. FIGS. 11A through 11D show aberrations occurred in the lens arrangement shown in FIG. 9 at an intermediate focal length. FIGS. 12A through 12D show aberrations occurred in the lens arrangement shown in FIG. 9 at the long focal length extremity. Table 3 shows the numerical values of the third embodiment.

A diaphragm having a radius of 0.89 is provided on the object-side of the positive second lens group 20, and the other diaphragm having a radius of 0.70 is provided on the image-side of the positive second lens group 20.

The basic lens arrangement is the same as the first embodiment; however, the positive lens element and the negative lens element constituting the positive third lens group 30 are not cemented.

In regard to the lens-group moving paths of FIG. 17, the negative first lens group 10 of the third embodiment is arranged to be movable, as indicated by the dotted line.

TABLE 3

FNo. = 1:2.8–4.4–6.2
f = 3.05–5.75–9.15
W = 37.9–19.9–13.2
fB = 0.00–0.00–0.00

| Surf. No. | r | d | Nd | ν |
|---|---|---|---|---|
| 1* | −6.941 | 1.00 | 1.49176 | 57.4 |
| 2 | 5.699 | 3.43–1.48–0.50 | | |
| 3* | 1.602 | 1.70 | 1.43875 | 95.0 |
| 4* | 6.698 | 0.50–4.65–7.68 | | |
| 5 | 8.814 | 0.60 | 1.58547 | 29.9 |
| 6* | 3.086 | 0.25 | | |
| 7 | 3.806 | 1.73–1.16–1.73 | 1.49700 | 81.6 |
| 8* | −3.345 | 1.67–1.01–0.49 | | |
| 9 | ∞ | 0.50 | 1.51633 | 64.1 |
| 10 | ∞ | — | | |

*designates the aspherical surface which is rotationally symmetrical with respect to the optical axis.

Aspherical surface data (the aspherical surface coefficients not indicated are zero (0.00)):

| Surf. NO | A4 | A6 |
|---|---|---|
| 1 | $0.36033 \times 10^{-2}$ | $0.39579 \times 10^{-3}$ |
| 3 | $-0.10942 \times 10^{-1}$ | $0.20895 \times 10^{-2}$ |
| 4 | $0.51991 \times 10^{-1}$ | $-0.27327 \times 10^{-3}$ |
| 6 | $0.32657 \times 10^{-2}$ | $-0.88189 \times 10^{-3}$ |
| 8 | $0.20052 \times 10^{-1}$ | $-0.25764 \times 10^{-2}$ |

| Surf. NO | A8 | A10 |
|---|---|---|
| 1 | $-0.87106 \times 10^{-4}$ | $0.47209 \times 10^{-5}$ |
| 3 | $-0.29963 \times 10^{-2}$ | |
| 4 | $0.20867 \times 10^{-1}$ | |
| 6 | $-0.25408 \times 10^{-4}$ | |
| 8 | $0.59557 \times 10^{-3}$ | $-0.34675 \times 10^{-4}$ |

[Embodiment 4]

FIG. 13 is the lens arrangement of the zoom lens system according to the fourth embodiment of the present invention. FIGS. 14A through 14D show aberrations occurred in the lens arrangement shown in FIG. 13 at the short focal length extremity. FIGS. 15A through 15D show aberrations occurred in the lens arrangement shown in FIG. 13 at an intermediate focal length. FIGS. 16A through 16D show aberrations occurred in the lens arrangement shown in FIG. 13 at the long focal length extremity. Table 4 shows the numerical values of the fourth embodiment.

A diaphragm having a radius of 1.12 is provided on the object-side of the positive second lens group 20, and the other diaphragm having a radius of 0.89 is provided on the image-side of the positive second lens group 20.

The basic lens arrangement is the same as the first embodiment.

In regard to the lens-group moving paths of FIG. 17, the negative first lens group 10 of the fourth embodiment is arranged to be stationary, as indicated by the solid line.

TABLE 4

FNo. = 1:2.8–3.7–4.4
f = 4.00–6.00–8.00
W = 32.4–21.1–15.8
fB = 0.00–0.00–0.00

| Surf. No. | r | d | Nd | ν |
|---|---|---|---|---|
| 1* | −11.761 | 1.00 | 1.49176 | 57.4 |
| 2 | 6.212 | 4.01–2.34–1.09 | | |
| 3* | 1.823 | 1.70 | 1.43875 | 95.0 |
| 4* | 10.035 | 0.92–4.09–5.76 | | |
| 5 | 16.542 | 0.50 | 1.76182 | 26.5 |
| 6 | 3.584 | 1.65 | 1.49700 | 81.6 |
| 7* | −4.733 | 2.42–0.93–0.50 | | |
| 8 | ∞ | 0.50 | 1.51633 | 64.1 |
| 9 | ∞ | — | | |

*designates the aspherical surface which is rotationally symmetrical with respect to the optical axis.

Aspherical surface data (the aspherical surface coefficients not indicated are zero (0.00)):

| Surf. NO | A4 | A6 |
|---|---|---|
| 1 | $-0.77692 \times 10^{-5}$ | $0.55991 \times 10^{-3}$ |
| 3 | $-0.29596 \times 10^{-2}$ | $0.87232 \times 10^{-3}$ |
| 4 | $0.34935 \times 10^{-1}$ | $0.49955 \times 10^{-2}$ |
| 7 | $0.13010 \times 10^{-1}$ | $-0.32285 \times 10^{-2}$ |

| Surf. NO | A8 | A10 |
|---|---|---|
| 1 | $-0.88961 \times 10^{-4}$ | $0.466443 \times 10^{-5}$ |
| 4 | $0.94737 \times 10^{-2}$ | |
| 7 | $0.39230 \times 10^{-3}$ | |

The numerical values of each condition of each embodiment is shown in Table 5.

TABLE 5

| | | Embod. 1 | Embod. 2 | Embod. 3 | Embod. 4 |
|---|---|---|---|---|---|
| (1) | fw/f1 | −0.555 | −0.539 | −0.492 | −0.493 |
| (2) | fw/f2 | 0.766 | 0.685 | 0.700 | 0.838 |
| (3) | fw/f3 | 0.389 | 0.414 | 0.487 | 0.319 |
| (4) | $m_{2t}/m_{2w}$ | 2.235 | 2.099 | 2.276 | 1.664 |
| (5) | $m_{3t}/m_{3w}$ | 1.342 | 1.430 | 1.318 | 1.202 |
| (6) | fw/r1 | −0.403 | −0.355 | −0.440 | −0.340 |
| (7) | ν2 | 95.0 | 95.0 | 95.0 | 95.0 |
| (8) | $ν_{3p} - ν_{3n}$ | 55.1 | 26.4 | 51.7 | 55.1 |

As can be understood from Table 5, each embodiment satisfies each condition. Furthermore, the various aberrations are well corrected.

According to the above description, a small-sized and high-quality zoom lens system, which (i) is constituted by a negative lens group, a positive lens group and a positive lens group, in this order from the object, and (ii) has a shorter focal length at the short focal length extremity, can be obtained.

What is claimed is:

1. A zoom lens system comprising a negative first lens group which is stationary or movable, a positive second lens group which is movable, and a positive third lens group which is movable, in this order from an object, wherein upon zooming from the short focal length extremity to the long focal length extremity, a distance between said negative first lens group and said positive second lens group decreases, and a distance between said positive second lens group and said positive third lens group increases; and wherein said zoom lens system satisfies the following conditions:

$0.3 < |fw/f_1| < 0.65 (f1 < 0)$ $0.6 < fw/f_2 < 1.2$ $0.3 < fw/f_3 < 0.6$ wherein fw designates the focal length of the entire zoom lens system at the short focal length extremity; and $f_i$ designates the focal length of the $i^{th}$ lens group (i=1, 2, 3).

2. The zoom lens system according to claim 1, further satisfying the following conditions:

$1.3 < m_{2t}/m_{2w} < 2.6$ $1.1 < m_{3t}/m_{3w} < 1.6$ wherein $m_{it}$ designates the lateral magnification of the $i^{th}$ lens group (i=2, 3) at the long focal length extremity when an object at infinity is in an in-focus state; and $m_{iw}$ designates the lateral magnification of the $i^{th}$ lens group (i=2, 3) at the short focal length extremity when an object at infinity is in an in-focus state.

3. The zoom lens system according to claim 1, wherein said negative first lens group comprises a single biconcave lens element, and wherein said single biconcave lens element satisfies the following condition:

$0.3 < |fw/r1| < 0.65 (r1 < 0)$ wherein r1 designates the radius of curvature of the object-side surface of said single biconcave lens element.

4. The zoom lens system according to claim 1, wherein said positive second lens group comprises a single positive lens element, and wherein said single positive lens satisfies the following condition:

$75 < ν2$ wherein

ν2 designates the Abbe number of said single positive lens element.

5. The zoom lens system according to claim 1, wherein said positive third lens group comprises a positive lens element and a negative lens element, and wherein said positive lens element and said negative lens element satisfy the following condition:

$25 < ν_{3p} - ν_{3n}$ wherein $ν_{3p}$ designates the Abbe number of said positive lens element of said third lens group; and $ν_{3n}$ designates the Abbe number of said negative lens element of said third lens group.

* * * * *